United States Patent [19]

Komossa

[11] Patent Number: 4,986,392

[45] Date of Patent: Jan. 22, 1991

[54] SHOCK ABSORBER WITH VARIABLE DAMPING CHARACTERISTIC

[75] Inventor: Werner Komossa, Börnsen, Fed. Rep. of Germany

[73] Assignee: Körber AG, Hamburg, Fed. Rep. of Germany

[21] Appl. No.: 351,414

[22] Filed: May 12, 1989

[30] Foreign Application Priority Data

May 13, 1988 [DE] Fed. Rep. of Germany ....... 3816351

[51] Int. Cl.$^5$ .......................... F16F 9/50; F16F 9/46
[52] U.S. Cl. ................................... 188/282; 188/319
[58] Field of Search ........... 188/319, 299, 282, 322.15, 188/322.22; 137/599.2; 251/129.15, 129.21

[56] References Cited

U.S. PATENT DOCUMENTS 4,765,445  8/1988  Komossa et al. .......... 188/322.22 X
4,854,429  8/1989  Casey ........................ 188/319 X Primary Examiner—Robert J. Oberleitner
Attorney, Agent, or Firm—Peter K. Kontler

[57] ABSTRACT

A shock absorber wherein a piston divides the internal space of a cylinder into two cylinder chambers and has a passage of variable cross-sectional area for the flow of damping fluid between the cylinder chambers. The piston has a first section which is connected with a piston rod and is in sliding engagement with the internal surface of the cylinder, and a second section which is reciprocable in the first section and has two sets of surfaces which are acted upon by damping fluid. The passage is defined by the two sections. One set of surfaces is acted upon by damping fluid which is pressurized as a result of axial movement of the piston in the cylinder, and the other set of surfaces is acted upon by damping fluid which fills a plenum chamber of the piston and is acted upon by a valving element forming part of an electrically operated fluid pressure regulating unit. The difference between the forces which the damping fluid applies to the two sets of surfaces determines the axial positions of the two sections of the piston with reference to each other and hence the cross-sectional area of the passage for the flow of damping fluid between the cylinder chambers.

15 Claims, 1 Drawing Sheet

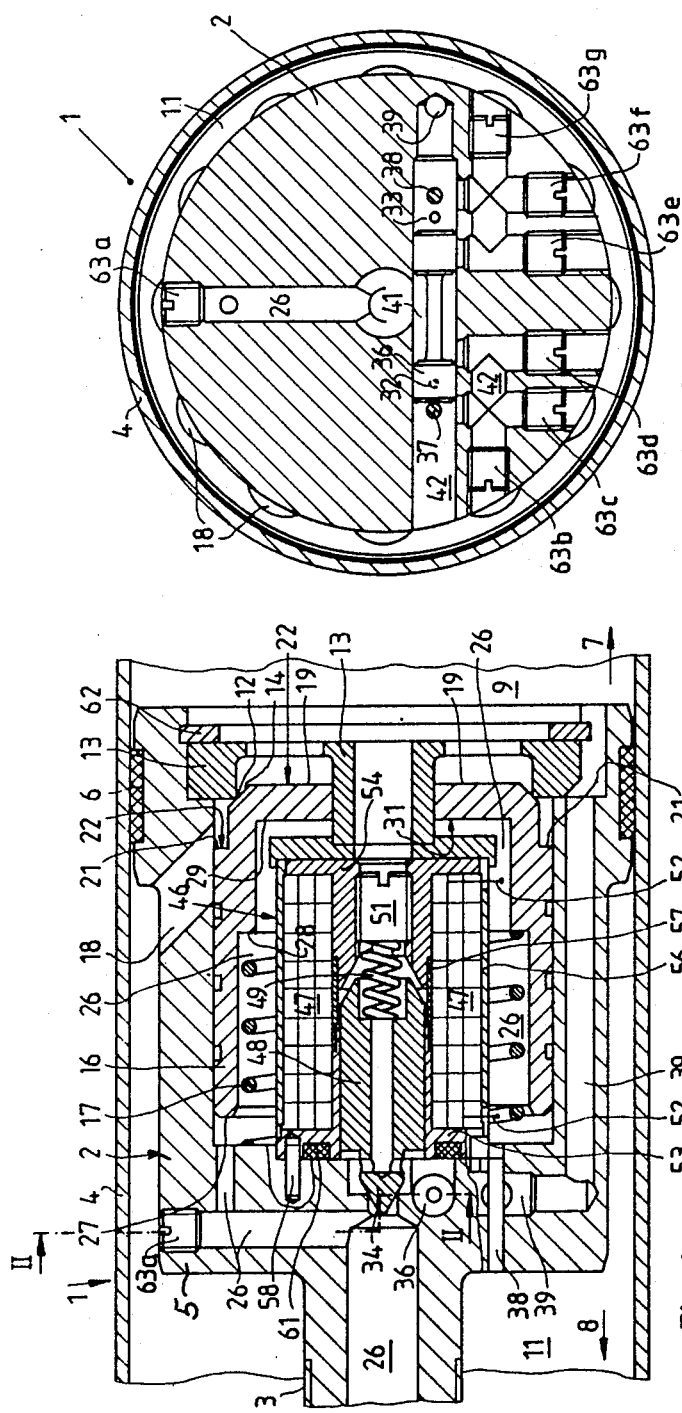
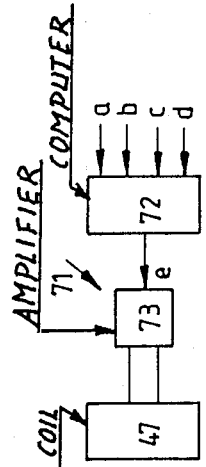

SHOCK ABSORBER WITH VARIABLE DAMPING CHARACTERISTIC

BACKGROUND OF THE INVENTION

The invention relates to improvements in shock absorbers with variable damping characteristics, especially to shock absorbers which can be utilized in motor vehicles. More particularly, the invention relates to improvements in shock absorbers of the type wherein the internal space of at least one cylinder is divided into two cylinder chambers by a piston which is sealingly and reciprocally received in the cylinder and is connected with one end of a piston rod. The piston rod extends from the cylinder and is connectable to one part of a motor vehicle. Another part of the vehicle (which is movable relative to the one part or vice versa) is connected with the cylinder, and the purpose of the shock absorber is to damp relative movements of the two parts. The chambers of the cylinder are filled with at least one damping fluid (such as oil), and the piston defines a passage for the flow of damping fluid from one of the chambers into the other chamber when the piston moves in one direction or from the other chamber into the one chamber when the piston moves in the opposite direction.

It is already known to provide a shock absorber of the above outlined character with electrically operated means for regulating the rate of flow of damping fluid between the two cylinder chambers in order to regulate the damping action of the shock absorber. Reference may be had, for example, to commonly owned U.S. Pat. No. 4,765,445 to Komossa et al. which discloses a shock absorber with a variable damping characteristic wherein the piston has one or more passages for the flow of damping fluid between the cylinder chambers and the piston is further provided with several bypass channels which extend between the two cylinder chambers. Discrete electrically operated means are provided for individually regulating the flow of damping fluid through the bypass channels.

A shock absorber with one or more bypass channels in the piston is also disclosed in commonly owned copending patent application Ser. No. 428,458, filed Oct. 30, 1989, which is a continuation of Ser. No. 254,191 filed Oct. 5, 1988, now abandoned.

OBJECTS OF THE INVENTION

An object of the invention is to provide a shock absorber wherein a single electrically operated regulating unit suffices to determine the rate of flow of damping fluid between the cylinder chambers to thus simplify the construction and reduce the initial cost of the shock absorber.

Another object of the invention is to provide a shock absorber which is constructed and assembled in such a way that the application of one and the same signal can initiate a first damping action when the piston moves in one direction and a different second damping action when the piston rod moves in another direction.

A further object of the invention is to provide a shock absorber wherein the means for regulating the damping action occupies little room and comprises a small number of simple parts.

An additional object of the invention is to provide a shock absorber wherein a substantial part of the regulating means can be confined in the interior of the cylinder.

Still another object of the invention is to provide the shock absorber with a novel and improved piston.

A further object of the invention is to provide the shock absorber with novel and improved means for varying the cross-sectional area of the passage for the flow of damping fluid between the cylinder chambers.

An additional object of the invention is to provide a novel and improved system of valves for use in the above outlined shock absorber.

Another object of the invention is to provide a novel and improved method of influencing the rate of flow of damping fluid between the cylinder chambers of the above outlined shock absorber.

An additional object of the invention is to provide the shock absorber with novel and improved means for normally sealing the passage between the cylinder chambers.

A further object of the invention is to provide the shock absorber with novel and improved electrically operated means for varying the magnitude of force with which damping fluid bears upon the piston.

SUMMARY OF THE INVENTION

The invention is embodied in a shock absorber with a variable damping characteristic which can be utilized with advantage in a motor vehicle. The improved shock absorber comprises at least one hollow cylinder defining an internal space for confinement of at least one damping fluid and having an internal surface surrounding the internal space, a piston rod which extends from the cylinder, and a piston which is provided on the piston rod and sealingly engages the internal surface of the cylinder to divide the internal space into first and second cylinder chambers. The piston has a passage (e.g., an annular passage) of variable cross-sectional area for the flow of damping fluid between the cylinder chambers, and is axially movable in the cylinder back and forth to pressurize damping fluid in one of the cylinder chambers with attendant flow of damping fluid through the passage into the other cylinder chamber and vice versa. The piston has a first surface (this first surface is or can constitute a composite surface including two or more neighboring or spaced-apart surfaces) which is acted upon by pressurized damping fluid in a first direction, and a second surface which is acted upon by damping fluid with a second force acting in a second direction counter to the first direction, and the shock absorber further comprises electrically operated regulating means for varying the second force. The cross-sectional area of the passage is a function of the difference between the first and second forces.

In accordance with a presently preferred embodiment, the piston includes a first section (e.g., a first sleeve-like part which is secured to the piston rod and sealingly engages the internal surface of the cylinder) and a second section (e.g., a second sleevelike part which is axially reciprocally installed in the first section). The second section is movable relative to, and defines the passage with, the first section. The aforementioned surfaces are or can be provided on one of the sections, for example, on the second section.

The arrangement is preferably such that the first surface is acted upon in the first direction by damping fluid which is pressurized by the piston irrespective of the direction of axial movement of the piston relative to the cylinder, i.e., regardless of whether the piston rod is drawn into or is being pulled out of the cylinder.

The first surface can include a first portion which is acted upon by pressurized fluid during axial movement of the piston in one direction, and a second portion which is acted upon by pressurized fluid during axial movement of the piston in another direction counter to the one direction.

The second surface of the piston can be acted upon in the second direction by damping fluid the (second) force of which is varied by the regulating means irrespective of the direction of axial movement of the piston, and each and every portion of the second surface is preferably acted upon by damping fluid with the second force irrespective of whether the piston rod is forced to penetrate deeper into the cylinder or to move in the opposite direction.

The piston preferably defines additional passages (hereinafter called paths) for the flow of damping fluid from the cylinder chambers to the second surface, and the regulating means includes valve means (e.g., valve with a reciprocable valving element) which admits damping fluid from the second surface to one of the cylinder chambers when the other cylinder chamber contains pressurized damping fluid and vice versa. The piston preferably defines a plenum chamber which is adjacent the second surface, and the paths are provided between such plenum chamber and the cylinder chambers.

Such shock absorber can further comprise a fluid-operated switching device (e.g., a reciprocable spool) which is movable relative to the paths between first and second positions in which the plenum chamber respectively communicates with the first and second cylinder chambers.

In accordance with a presently preferred embodiment of the invention, the aforementioned valve means comprises a single electric exciter coil. The valve means further comprises a valving element which is movable in opposite directions to thereby respectively increase and reduce the second force (i.e., to influence the cross-sectional area of the passage), and a coil spring or other suitable means for yieldably biasing the valving element in one of the opposite directions. The regulating means further comprises means (e.g., a computer and an amplifier) for supplying to the single coil energy at a variable rate to thereby move the valving element in the other of the opposite directions to any one of a Plurality of different positions in each of which the pressure of damping fluid in the plenum chamber is influenced in a different way.

The energy supplying means can include (a) means for supplying to the coil current at a predetermined voltage to select a given second force, or (b) means for applying to the coil a predetermined sequence of pulses to thus select a given second force. The latter energy supplying means can include means for supplying pulses of variable duration and/or at a variable frequency.

The novel features which are considered as characteristic of the invention are set forth in particular in the appended claims. The improved shock absorber itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a fragmentary axial sectional view of a shock absorber which embodies one form of the invention;

FIG. 2 is a transverse sectional view substantially as seen in the direction of arrows from the line II—II of FIG. 1;

FIG. 3 is a diagrammatic view of current supplying means for use in a regulating unit which can be installed in the shock absorber of FIG. 1; and FIG. 4 is a similar diagrammatic view of modified current supplying means.

DESCRIPTION OF PREFERRED EMBODIMENTS

FIGS. 1 and 2 show certain parts of a shock absorber 1 which comprises a cylinder 4, a piston rod 3 which extends from one end of the cylinder 4, and a piston 2 connected to that end of the piston rod 3 which is located in the interior of the cylinder. The piston 2 confines several components of means for regulating the damping action of the shock absorber 1. One part of a motor vehicle is connected to the piston rod 3 outside of the cylinder 4, and another part of the motor vehicle is connected to the cylinder 4 so that the shock absorber 1 can damp the movements of such parts toward and away from each other.

The piston 2 is provided with an annular sealing element 6 which is in sealing engagement with the internal surface of the cylinder 4. When the shock absorber 1 is stressed in a first direction (arrow 7) to push the piston rod 3 deeper into the cylinder 4 so that the parts which are connected to the piston rod and to the cylinder move nearer to each other, the piston 2 pressurizes a damping fluid (e.g., oil) in a cylinder chamber 9 which forms part of the internal space of the cylinder. On the other hand, when the two parts are pulled apart so that the piston rod 3 moves to the left (as seen in FIG. 1), the piston 2 moves in the direction of arrow 8 and pressurizes damping fluid in the left-hand cylinder chamber 11. Thus, a "pull" upon the shock absorber 1 (i.e., the application of a force which tends to increase the combined length of the cylinder 4 and piston rod 3) results in pressurization of damping fluid in the cylinder chamber 11, and a "push" upon the shock absorber (namely the application of a force in a direction to reduce the combined length of the cylinder and piston rod) results in pressurization of damping fluid in the cylinder chamber 9.

The piston 2 can define a passage of variable cross-sectional area for the flow of damping fluid from the chamber 9 into the chamber 11 (when the pressure in the chamber 9 is higher than in the chamber 11) and vice versa, depending upon whether the piston is caused to move in the direction of arrow 7 or 8 (it being assumed here that the part which is attached to the piston rod 3 is movable or moves relative to the part which is connected to the cylinder 4). The just mentioned passage is defined by a ring-shaped edge 12 on a ring-shaped throttling member 13 of the piston 2 and by a frustoconical surface 14 which is provided on a cupped slide 16 forming one of two relatively movable sections of the piston 2. The other section of the piston 2 is a sleeve 5 which can be said to include the throttling member 13 and carries the aforementioned sealing element 6. The throttling member 13 is held against axial movement relative to the main body portion of the section 5 by a split ring 62.

In accordance with a feature of the invention, the shock absorber 1 comprises novel and improved electrically operated means for regulating the rate of flow of damping fluid through the annular passage between the edge 12 and surface 14 (when such passage exists) by varying the cross-sectional area of the passage to thus regulate the damping action of the shock absorber 1. A relatively weak coil spring 17 operates between the sections 5, 16 of the piston 2 to permanently urge the surface 14 against the edge 12, i.e., to reduce the cross-sectional area of the passage to zero (as shown in FIG. 1). Such situation will develop when the pressure of damping fluid in the cylinder chamber 9 matches or closely approximates the pressure of damping fluid in the cylinder chamber 11. The section 5 of the piston 2 has an annulus of inclined channels 18 which permit damping fluid to flow from the passage between the edge 12 and surface 14 into the cylinder chamber 11 or in the opposite direction, depending upon whether the piston 2 moves in the direction of arrow 7 (push) or in the direction of arrow 8 (pull). An advantage of a passage which is bounded by an edge (12) and a conical surface (14) is that the damping action can be varied in response to one and the same signal in a first way when the shock absorber 1 is subjected to pull and in a different second way when the shock absorber is subjected to push.

The slide 16 has a first composite surface which is acted upon by damping fluid when the pressure in the cylinder chamber 9 or 11 rises. This composite surface has a first portion including that part of the aforementioned conical surface 14 which is disposed within the edge 12 and an end face or surface 19 which is radially inwardly adjacent the surface 14, and a second portion including the part of the surface 14 around the edge 12 and an annular surface or shoulder 21 which is located radially outwardly of the surface 14. The first portion 14, 19 is acted upon by pressurized damping fluid in the cylinder chamber 9 in response to movement of the piston 2 in the direction of arrow 7 (push), and the second portion 14, 21 is acted upon by damping fluid in the cylinder chamber 11 when the piston is caused to move in the direction of arrow 8 (pull). Damping fluid acts upon the surfaces 14, 19 and 14, 21 in the same direction, namely in the direction of arrow 22 (same as the direction indicated by arrow 8). However, the magnitude of the force acting upon the surfaces 14, 19 is greater than that of the force acting upon the surfaces 14, 21 because the combined area of the surface 19 and the part of the surface 14 within the edge 12 is greater than the combined area of the surface 21 and the part of the surface 14 around the edge 12. The action of the shock absorber 1 should normally be softer in the direction of push (movement of the piston 2 in the direction of arrow 7); therefore, the combined area of the surface 19 and the part of surface 14 within the edge 12 is greater than the combined area of the surface 21 and the part of the surface 14 around the edge 12. The force acting in the direction of arrow 22 (either in response to a rise of pressure of damping fluid in the cylinder chamber 9 or in response to a rise of pressure of damping fluid in the cylinder chamber 11) will be called a first force.

The sections 5 and 16 of the piston 2 define a plenum chamber 26 which is filled with damping fluid, and such fluid is maintained at a pressure which is less than that in the cylinder chamber 9 (when the piston 2 moves in the direction of arrow 7) or in the cylinder chamber 11 (when the piston 2 moves in the direction of arrow 8). The pressure of damping fluid in the plenum chamber 26 is regulatable by electric means. Such damping fluid acts upon a second composite surface which is also provided on the section or slide 16 and includes a first annular surface or end face 27 at the left-hand axial end of the slide 16 (as seen in FIG. 1), an annular internal shoulder or surface 28 of the slide 16 intermediate the two axial ends of the slide, and an annular end face or surface 29 opposite the end face or surface 19. Damping fluid which exerts pressure upon the composite surface 27-29 generates a second force which acts in the direction of arrow 31, i.e., counter to the direction (arrow 22) of action of the first force. This holds true irrespective of whether the plenum chamber 26 receives damping fluid from the cylinder chamber 9 or 11.

The electrically operated regulating means for varying the magnitude of the second force, and hence the extent to which the edge 12 and the conical surface 14 move apart during movement of the piston 2 in the direction of arrow 7 or 8, is installed in part in the interior of the slide 16. The magnitude of the second force is regulated by varying the pressure of damping fluid in the plenum chamber 26, i.e., the pressure of such fluid against the composite surface 27-29. A path for the flow of damping fluid between the chambers 9 and 6 is defined in part by a calibrated bore 33, and a path for the flow of damping fluid between the chambers 11 and 6 is established in part by a calibrated bore 32. Damping fluid can leave the plenum chamber 26 by way of an annular gap around the conical tip 34 of an axially reciprocable valving element 48 forming part of a valve 46 which, in turn, forms part of the regulating means. The gap permits damping fluid to flow from the plenum chamber 26 into that cylinder chamber (9 or 11) wherein the pressure is lower than in the other cylinder chamber.

The path for the flow of damping fluid from the conical tip 34 of the valving element 48 contains a hydraulically operated switching device 36 in the form of an axially movable spool (see particularly FIG. 2) which can seal the bore 32 or 33, depending upon whether it is caused to abut a stop 37 (bore 32 sealed, as actually shown in FIG. 2) or a stop 38 (bore 33 sealed). The arrangement is such that the channels 39, 42 which are adjacent the first and second end faces of the switching device 36 respectively communicate with the cylinder chambers 9 and 11. When the pressure of damping fluid in the cylinder chamber 9 is higher than in the cylinder chamber 11, damping fluid flows from the chamber 9 into and beyond the channel 39 to act upon the right-hand end face of the switching device 36 so that the latter abuts the stop 37 and seals the bore 32 while permitting pressurized damping fluid to flow through the bore 33 from the plenum chamber 26 into the cylinder chamber 11. If the pressure in the cylinder chamber 11 exceeds the pressure in the cylinder chamber 9, pressurized damping fluid flows from the chamber 11 into the channel 42 to act upon the left-hand end face of the switching device 36 which then moves in a space 41 against the stop 38 to seal the bore 33 and to enable the bore 32 to convey pressurized damping fluid from the plenum chamber 26 into the cylinder chamber 9. In either event, damping fluid flows around the conical tip 34 of the valving element 48. It will be noted that the switching device 36 constitutes a means for establishing communication between the plenum chamber 26 and that cylinder chamber 9 or 11 wherein the pressure of damping fluid is lower than in the other cylinder chamber.

The pressure of damping fluid in the plenum chamber 26 determines the magnitude of the second force acting (arrow 31) upon the composite surface 27–29 and hence counter to the direction (arrow 22) of action of the first force upon the surfaces 14, 19 or 14, 21. Since the second force is smaller than the first force, the slide 16 is shifted in the direction of arrow 22 through a distance which is a function of the difference between the magnitudes of the first and second forces or between the second force and a force which is proportional to the first force. Such shifting of the slide 16 from the starting position of FIG. 1 (in which the pressure of damping fluid in the cylinder chamber 9 matches or closely approximates the pressure of damping fluid in the cylinder chamber 11 so that the relatively weak spring 17 can maintain the conical surface 14 in abutment with the edge 12 to thus reduce the cross-sectional area of the passage to zero) determines the cross-sectional area of the passage at 12, 14 and hence the damping action of fluid which is permitted to flow from the cylinder chamber 9 into the cylinder chamber 11 or vice versa. If the pressure of damping fluid in the plenum chamber 26 is reduced, the cross-sectional area of the passage at 12, 14 increases and the damping action decreases, i.e., the shock absorber 1 is softer.

The valve 46 of the regulating means for varying the pressure of damping fluid in the plenum chamber 26 (and hence the magnitude of the second force) includes the aforementioned reciprocable valving element 48 with its conical tip 34, a coil spring 49 which reacts against an axially adjustable externally threaded bias regulating element 51 in the slide 16 and bears against the valving element 48 in a direction to maintain the tip 34 in engagement with or close to its seat in the section 5 of the piston 2, and an excitable inductance coil 47 having terminals 52 for connection in circuit with an amplifier 68 (FIG. 3) or 73 (FIG. 4). If a control voltage is applied to the coil 47, the resulting electromagnetic force acts upon the valving element 48 in the direction of arrow 31, i.e., counter to the direction of bias of the spring 49. Thus, the inductance coil 47 can cause the valving element 48 to increase the cross-sectional area of the gap between the tip 34 and the seat for the valve 46 to thus ensure that the rate of fluid flow from the plenum chamber 26 into the cylinder chamber 9 or 11 (namely into the cylinder chamber wherein the pressure of damping fluid is lower than in the other cylinder chamber) is higher than when the axial position of the valving element 48 is determined exclusively by the spring 49. As the valving element 48 moves against the resistance of the spring 49 (in the direction of arrow 31), the pressure of damping fluid in the plenum chamber 26 decreases together with the magnitude of the second force. Thus, the difference between the magnitudes of the first and second forces increases and the damping action becomes weaker or softer because the slide 16 can move further away from the edge 12 and the cross-sectional area of the passage for the flow of damping fluid between the cylinder chambers 9 and 11 via channels 18 increases.

If the electric regulating means for varying the magnitude of the second force by varying the pressure of damping fluid in the plenum chamber 26 fails for whatever reason, the axial position of the valving element 48 is determined exclusively by the spring 49 so that the rate of flow of damping fluid around the conical tip 34 of the valving element 48 is reduced to a minimum and the pressure of damping fluid in the plenum chamber 26 rises to a maximum value. In other words, the damping action is very pronounced which is desirable for reasons of safety.

The coil 47 is surrounded by sleeves 53, 54 and 56 of ferromagnetic material and in part by a sleeve 57 of diamagnetic or nonmagnetic material. A pin 58 or a like element in the section 5 of the piston 2 serves to prevent rotation of the coil 47. A sealing ring 61 is installed between the sleeve 53 and the adjacent end wall of the piston section 5. FIG. 2 further shows several threaded plugs 63a to 63g which seal the space 41 for the switching device 36, the channels 39, 42 and certain other cavities in the piston 2.

FIG. 3 shows certain components of that part 66 of the regulating means which is not or cannot be installed in the cylinder 4. The part 66 comprises a computer 67 with several inputs (FIG. 3 shows four inputs a, b, c and d) for the application of information from suitable sensors (not specifically shown) including sensors which monitor the condition of the rod and certain parameters of the vehicle in which the shock absorber 1 is put to use. The parameters can include momentary acceleration, deceleration, angular position of the steering wheel, vehicle speed and/or others. Signals which are applied to the inputs a to d are processed in accordance with well-known programs in a manner not forming part of the present invention, and the analog signal at the output e of the computer 67 is amplified by the amplifier 68 which controls the application of voltage to the terminals 52 of the inductance coil 47. This ensures that the magnitude of the second force, and hence the cross-sectional area of the passage between 12 and 14, is a function of the characteristics of the signal at the output e of the computer 67, i.e., that the damping action of the shock absorber 1 matches the optimum damping action as calculated at 67. If the speed of the vehicle or another parameter which is represented by the signal to at least one of the inputs a to d changes, the computer 67 alters the signal at its output e and the amplifier 68 ensures that the damping action of the shock absorber 1 is changed accordingly.

FIG. 4 shows a part 71 of a modified regulating means. The computer 72 has several inputs (inputs a to d are shown) and an output e which transmits signals to the terminals of the coil 47. The output e of the computer 72 transmits a series of pulses which are amplified at 73 and serve to preferably rapidly switch the solenoid valve 47 back and forth for operation between two extremes. The operation of the valve 47 is then analogous to that of a so-called flutter valve or flopping valve, i.e., without actually changing the rate of fluid flow. The movements which the valving element 47 tends to perform are damped hydraulically as well as mechanically so that the valving element does not continuously change the damping action of the shock absorber 1 by repeatedly increasing and reducing the second force. If the duration of each pulse is fixed, the magnitude of the second force can be changed by changing the frequency of pulses at the output e of the computer 72. Alternatively, and if the intervals between successive pulses of the series are constant, the magnitude of the second force can be varied by changing the duration of pulses. It is equally possible to change the magnitude of the second force by simultaneously changing the duration of pulses as well as their frequency.

An important advantage of the improved shock absorber is that a single electromagnetic valve suffices to regulate the damping action when the piston 2 is pushed in the direction of arrow 7 or is pulled in the direction of arrow 8. Moreover, a given signal which is applied to the coil 47 can serve to initiate a damping action of a first magnitude during movement of the piston in the direction of arrow 7 and a damping action of a second magnitude during movement of the piston 2 in the direction of arrow 8. This is achieved with the switching device 36.

Another advantage of the improved shock absorber 1 is that the coil 47 need not perform any movements relative to the piston section 5. Moreover, the electromagnetic valve 46 is superior to a so-called distributing valve wherein the extent of displacement of the valving element must correspond to the control voltage. This is due to the fact that the valve 46 can act as a means for limiting the pressure of damping fluid in the plenum chamber 26.

A further advantage of the improved shock absorber 1 is that the damping action becomes more pronounced if the regulating means happens to fail. As mentioned above, this is desirable for reasons of safety if the shock absorber is installed in a motor vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A shock absorber with a variable damping characteristic, particularly for use in motor vehicles, comprising at least one hollow cylinder defining an internal space for confinement of at least one damping fluid and having an internal surface surrounding said space; a piston rod extending from said cylinder; a piston provided on said piston rod and sealingly engaging said internal surface to divide said internal space into a first and a second cylinder chamber, said piston having first and second sections one of which is movable relative to the other of said sections and said sections defining a single passage of variable cross-sectional area for the entire flow of damping fluid between said chambers, said piston being axially movable in said cylinder back and forth to pressurize damping fluid in one of said chambers with attendant flow of fluid through said single passage into the other of said chambers and vice versa, said one section of said piston having a first surface which is acted upon by pressurized damping fluid with a first force acting in a first direction and a second surface which is acted upon by damping fluid with a second force acting in a second direction counter to said first direction; and electrically operated regulating means for varying said second force to thereby move said one section relative to said other section and to thus vary the area of said single passage as a function of the difference between said first and second forces.

2. The shock absorber of claim 1, wherein said first surface of said one section is positioned to be acted upon in said first direction by fluid which is pressurized by said piston irrespective of the direction of axial movement of the piston relative to said cylinder.

3. The shock absorber of claim 1, wherein said first surface of said one section includes a first portion which is acted upon by pressurized fluid during axial movement of said piston in one direction and a second portion which is acted upon by pressurized fluid during axial movement of the piston in another direction counter to said one direction.

4. The shock absorber of claim 1, wherein said second surface is acted upon in said second direction by fluid the pressure of which is varied by said regulating means irrespective of the direction of axial movement of said piston.

5. The shock absorber of claim 1, wherein the entire second surface of said one section is acted upon by fluid at said second pressure during axial movement of said piston in one direction as well as in another direction counter to said one direction.

6. The shock absorber of claim 1, wherein said piston defines paths for the flow of fluid from said chambers to said second surface, said regulating means including valve means for admitting fluid from said second surface to one of said chambers when the other of said chambers contains pressurized fluid and vice versa.

7. The shock absorber of claim 6, wherein said piston defines a plenum chamber adjacent said second surface and said paths are provided between said plenum chamber and said cylinder chambers.

8. The shock absorber of claim 7, further comprising a fluid-operated switching device movable relative to said paths between first and second positions in which said plenum chamber respectively communicates with said first and second cylinder chambers.

9. The shock absorber of claim 1, wherein said regulating means comprises a single electric inductance coil.

10. The shock absorber of claim 9, wherein said regulating means includes valve means including a valving element which is movable in opposite directions to thereby respectively increase and reduce the second force, and means for yieldably biasing said valving element in one of said opposite directions, said regulating means further comprising means for supplying to said coil energy at a variable rate to thereby move said valving element in the other of said opposite directions to any one of a plurality of different positions.

11. The shock absorber of claim 10, wherein said supplying means includes means supplying to said coil energy at a variable rate to thereby vary said second force.

12. The shock absorber of claim 11, wherein said energy supplying means comprises means for supplying to said coil energy at a predetermined voltage to select a predetermined second force.

13. The shock absorber of claim 11, wherein said energy supplying means comprises means for supplying to said coil a predetermined sequence of pulses to select a predetermined second force.

14. The shock absorber of claim 13, wherein said energy supplying means includes means for supplying pulses of variable duration to thereby vary said second force.

15. The shock absorber of claim 13, wherein said energy supplying means includes means for supplying pulses at a variable frequency to thereby vary said second force.

* * * * *